UNITED STATES PATENT OFFICE.

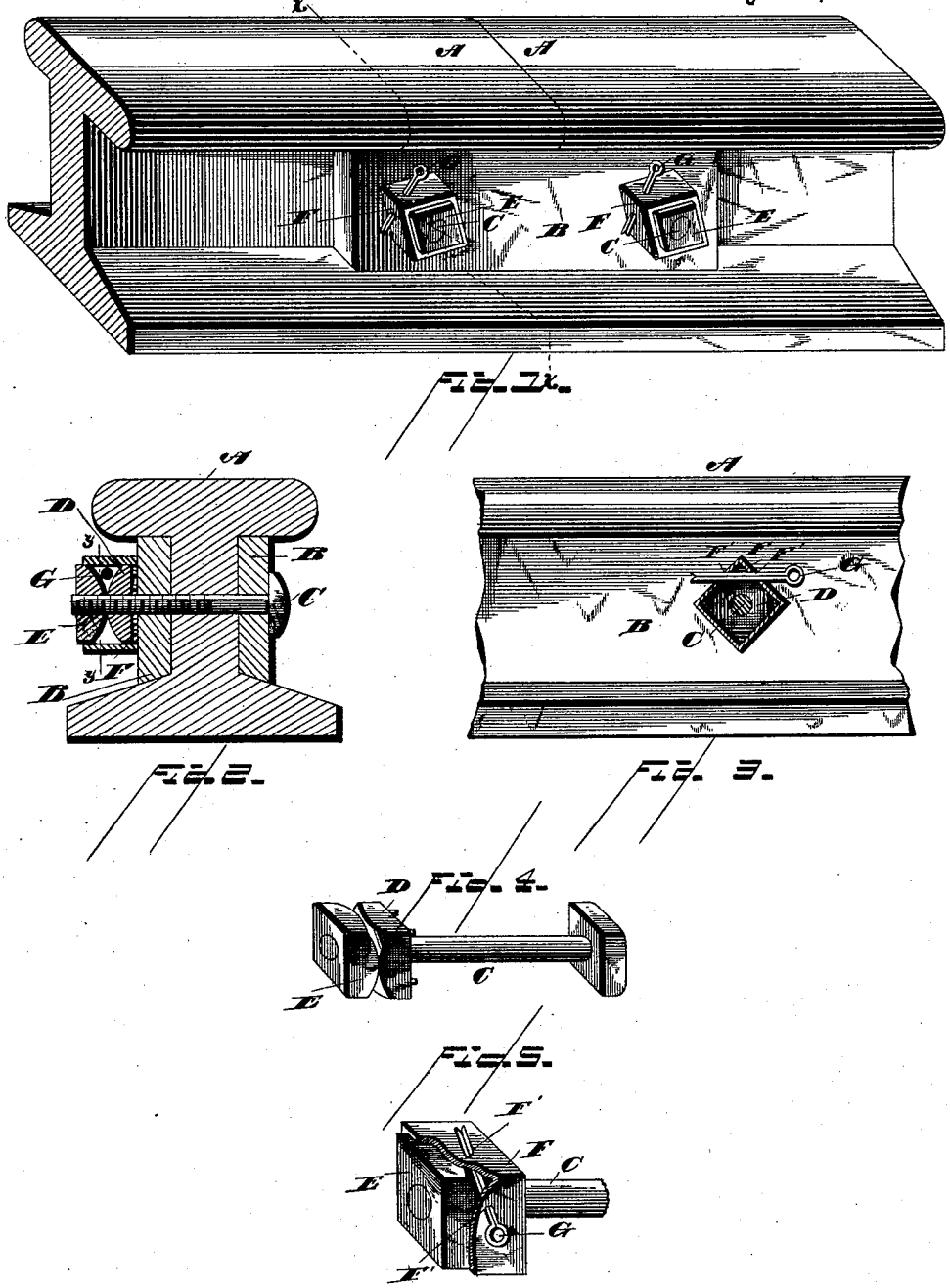

JOHN BAKER, OF CHICAGO, ILLINOIS.

NUT-LOCK.

SPECIFICATION forming part of Letters Patent No. 367,084, dated July 26, 1887.

Application filed November 30, 1886. Serial No. 220,288. (No model.)

*To all whom it may concern:*

Be it known that I, JOHN BAKER, a citizen of the United States, residing at Chicago, in the county of Cook and State of Illinois, have invented new and useful Improvements in Nut-Locks, of which the following is a specification.

My invention relates to improvements on my former patent, No. 347,764.

My invention consists in an improved nut-lock, in which the nut is immovably keyed on the bolt without cutting or weakening in any way either the bolt or the nut, thus leaving the bolt and nut with their full strength and materially lessening the cost of manufacture.

My invention will be hereinafter fully described and claimed.

Referring to the accompanying drawings, Figure 1 is a perspective view showing my improved nut-lock in its operative position. Fig. 2 is a vertical sectional view taken on line $x\,x$, Fig. 1. Fig. 3 is a sectional view taken on line $y\,y$, Fig. 2. Fig. 4 is a perspective view of the bolt with the washer and nut in their operative positions; and Fig. 5 is a perspective detail view with part of the sleeve broken away.

The same letters of reference indicate corresponding parts in all the figures.

Referring to the several parts by letter, A A represent the adjoining ends of two railway-rails of ordinary construction, and B B the fish-plates.

C C indicate the bolts, which are passed through the apertures in the fish-plates and rails in the usual way.

D D indicate the washers, which are precisely similar in shape to the nuts E, being formed with four or more sides, to correspond with the number of sides of the nuts. The flat side of each washer, which bears against the fish-plate, is formed either with spurs, where it is used against wood-work, or with corrugations, lugs, or flanges to engage with similar projections, where it is used with or against iron-work, the object of these spurs, corrugations, or projections being to prevent the washer from turning. The other or outer side of the washer is convex or rounded, as shown, and the nut is similarly formed, with a flat and a convex or rounded side. The washer being placed on the bolt with its flat side against the fish-plate, the nut is screwed on the bolt with its rounded side next to and bearing against the outer rounded side of the washer, when the sleeve F is slipped over the nut and washer so as to inclose them both. At one end of the sleeve are formed two holes, F' F', located on opposite sides of the end or angle of the sleeve, and adapted to receive a rivet, or preferably a split key, G. This split key is inserted through the holes F', passing on its way between the nut and washer, through the space between their rounded ends, as clearly shown in the drawings, the result of rounding the meeting faces of the nut and washer being to leave a space between their ends or corners, while between these ends the two come in contact.

It will be seen that after the key has been inserted through the holes in the sleeve, and between the rounded ends of the nut and washer, it is impossible for the nut to turn on the bolt or for the sleeve to slip off, the spurs or corrugations of the washer holding it immovable and preventing it from turning with the sleeve and nut, which might otherwise occur.

From the foregoing description, taken in connection with the accompanying drawings, the construction, operation, and advantages of my improved nut-lock will be clearly understood. It will be seen that by constructing the washer and nut with the convex sides forming the rounding corners and arranging them as shown and described the nut is firmly and immovably locked on the bolt, and that neither the bolt nor nut are cut or weakened in any degree, thus preserving the full strength of the bolt and nut, and decreasing the cost of manufacture to a very material extent. The outer end of the sleeve may be left open, as shown, or it may be extended out over the end of the bolt and closed and finished in an ornamental manner.

Having thus described my invention, what I claim, and desire to secure by Letters Patent of the United States, is—

1. The combination, with the bolt, of the washer formed with the convex or rounded side, the nut having the rounded or convex side arranged adjacent to the convex side of the washer, the angular sleeve having the apertures F', and the locking-key, substantially as and for the purpose set forth.

2. The combination, with the bolt and a fish-plate having corrugations or lugs formed around its bolt-hole, of the washer formed with the flat side having the spurs or corrugations and the convex or rounded side, the nut having the rounded or convex side, the angular sleeve having the apertures F', and the spring-key, substantially as and for the purpose herein set forth.

In testimony that I claim the foregoing as my own I have hereto affixed my signature in presence of two witnesses.

JOHN BAKER.

Witnesses:
E. W. MASSEY,
E. L. SIBLEY.